United States Patent [19]

Tanguy et al.

[11] 4,009,588
[45] Mar. 1, 1977

[54] ELECTRICAL APPLIANCE FOR MAKING SORBET

[75] Inventors: Pierre Tanguy, Daix; André Faivre, Dijon, both of France

[73] Assignee: Societe Anonyme Etud, Dijon, France

[22] Filed: Jan. 24, 1975

[21] Appl. No.: 543,798

[30] Foreign Application Priority Data

Jan. 30, 1974 France .............................. 74.03045

[52] U.S. Cl. .................................... 62/126; 62/136
[51] Int. Cl.² ...................... A23G 9/00; A23G 9/22
[58] Field of Search .................... 62/136, 342, 126; 259/DIG. 34

[56] References Cited
UNITED STATES PATENTS 1,956,322  4/1934  Grant .............................. 62/136 X Primary Examiner—William E. Wayner
Attorney, Agent, or Firm—Raymond A. Robic; Arthur Schwartz

[57] ABSTRACT

An appliance for making sorbet or ice cream and including means for preventing the mixer blades from becoming locked in the ice by effecting the progressive withdrawal of these blades from a vertical orientation towards a horizontal orientation under the action of the opposing torque applied to the blades by the hardening of the ice during freezing, and an automatic stopping device which is mechanically operable as a result of the withdrawal of the blades or a part associated therewith to break the motor supply circuit when the blades reach their withdrawn position.

8 Claims, 17 Drawing Figures

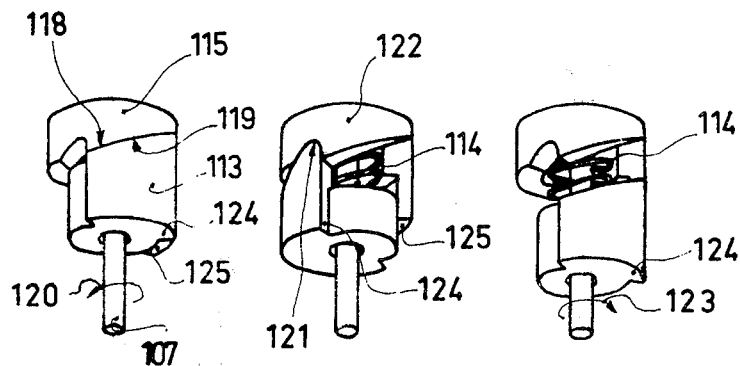
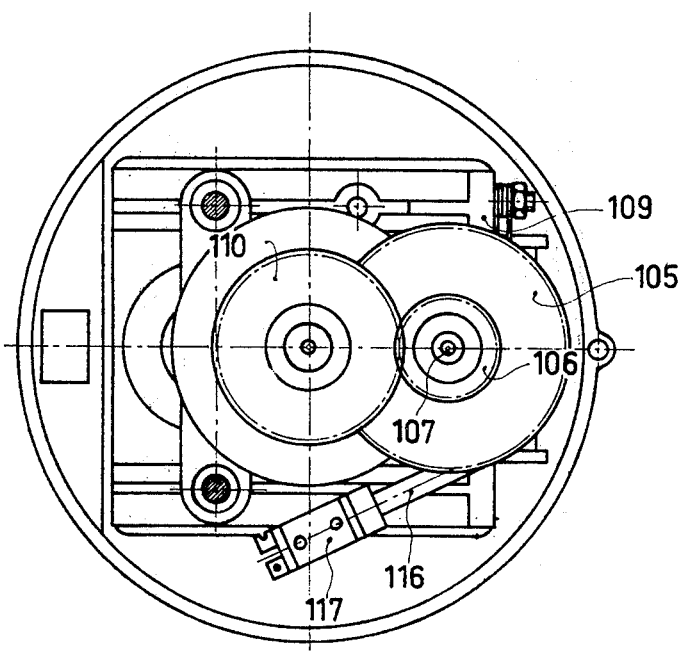

ELECTRICAL APPLIANCE FOR MAKING SORBET

BACKGROUND TO THE INVENTION

This invention relates to an appliance for making sorbet or ice cream.

U.S. patent application Ser. No. 292,121 filed Sept. 25, 1972, now U.S. Pat. No. 3,916,637, relates to an electrical domestic appliance intended for making ice cream and fruit sorbet in a cold enclosure, such as the ice box of a refrigerator. Said application is herewith incorporated by reference. The principal feature of this apparatus is the provision of means which prevents the stirrer blades from becoming blocked in the ice by effecting progressive withdrawal of those blades from a vertical orientation towards a horizontal orientation under the action of the opposing torque applied to the blades by the hardening of the ice during freezing. The appliance is especially intended for making ice cream and sorbet with two flavours. U.S. patent application Ser. No. 429,820 filed Jan. 2nd, 1974, now U.S. Pat. No. 3,926,414, relates to a device for automatically stopping the gear motor of the application and for indicating when the blades reach their withdrawn position. Said application is herewith incorporated by reference. This device is characterised by the fact that one of the stepped pinions of a reducing mechanism, which transmits the rotational movement of the motor to a sprocket driving the blades, is axially displaceable under the action of the reactive torque arising from the resistance offered to the mixer blades by the thickening of the preparation as it freezes.

In one embodiment described in this second patent, a microswitch with two stable positions is used, a moving coil of the microswitch being activated on the one hand by the aforementioned axial displacement and, on the other hand, by the bending of a deformable bimetallic element under the effect of increase in temperature of the magnetic circuit of the motor. The microswitch has to be reset by a push-button extending through the cover of the gear motor housing.

Although working satisfactorily, this embodiment does have certain disadvantages. Thus, a bimetallic strip is difficult to fix either by welding or by screwing due to the structure of the laminar magnetic circuit. In addition, the push-button is difficult to seal.

The object of the present invention is to provide an appliance having an improved automatic stopping device.

BRIEF SUMMARY OF THE INVENTION

According to the invention, there is provided an appliance for making sorbet or ice cream and including means for preventing the mixer blades from becoming locked in the ice by effecting the progressive withdrawal of these blades from a vertical orientation towards a horizontal orientation under the action of the opposing torque applied to the blades by the hardening of the ice during freezing, and an automatic stopping device which is mechanically operable as a result of the withdrawal of the blades or a part associated therewith to break the motor supply circuit when the blades reach their withdrawn position.

FURTHER FEATURES OF THE INVENTION

In a first embodiment of the invention, the automatic stopping device is activated by axial displacement of a stepped pinion, which engages a miniature reversing switch with one stable position. This reversing switch is thus held in an unstable position in which it completes the motor feed circuit as long as the torque is applied to the blades, and is released into its stable position in which it breaks the motor supply circuit, optionally releasing an indicating signal at the same time, as soon as the withdrawal of the blades causes the torque to disappear.

In this embodiment, the miniature reversing switch is reset either by acting manually on an intermediate mechanism for transmitting the axial displacement to the movable armature of the microswitch, or preferably by manual application of force to an arm supporting the blades, in the direction opposite to the normal stirring direction.

In a second embodiment of the invention, the automatic stopping device is activated immediately on completion of the withdrawal of the blades by a projection on one of the blades, which is adapted to reach the raised position shortly after the other blade or blades.

In this second embodiment, the projection either indirectly operates the movable armature of a microswitch or reversing switch to break the motor supply circuit, or comes into contact with a stop, preferably resiliently mounted, the resulting heating of the magnetic circuit of the motor acting on a temperature limiter which breaks the motor supply circuit.

BRIEF DESCRIPTION OF DRAWINGS

Embodiments of an appliance incorporating an automatic stopping device according to the invention are described in detail hereinafter with reference to the accompanying drawings, wherein:

FIGS. 10, 11 and 12 are views of a cam system for resetting and releasing a miniature reversing switch of the embodiment shown in FIGS. 8 and 9, respectively, in its three main positions;

FIG. 13 is a view from beneath of the gear motor show in FIGS. 8 and 9 with its cover removed;

DESCRIPTION OF EMBODIMENTS

Figure 1:
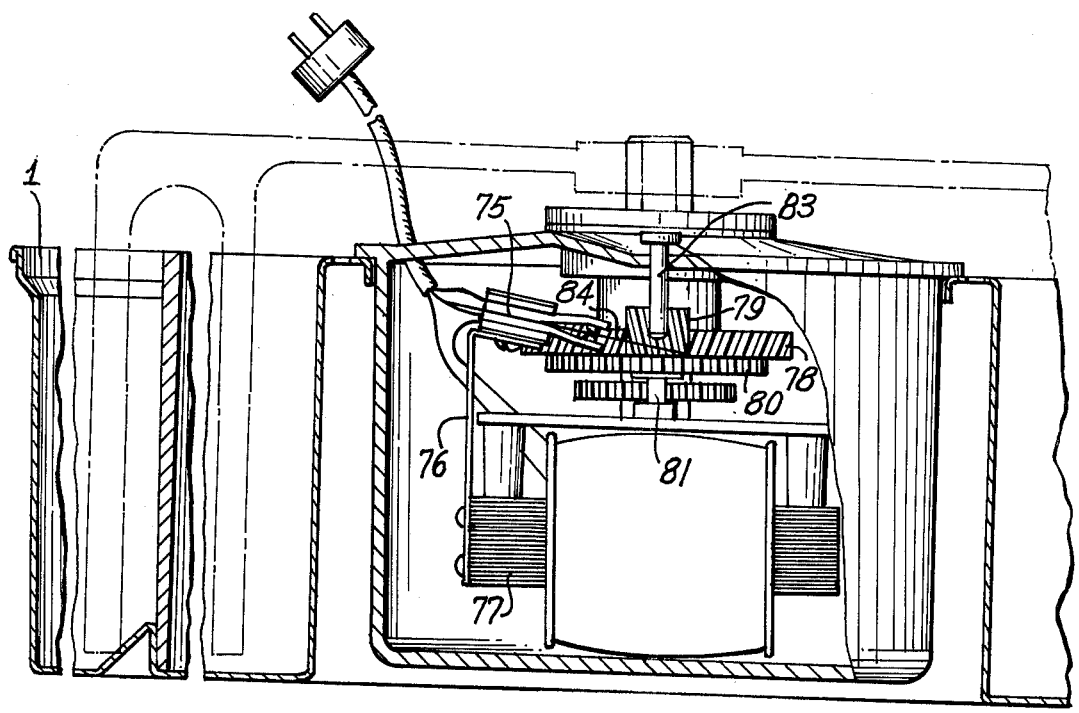
FIG. 1 is a section through an ice cream making appliance equipped with a gear motor having an axially displaceable stepped pinion.

FIG. 1 shows a tank 1 and a motor block shown partly in section comprising essentially the same principal elements as in U.S. Pat. No. 3,926,414. Microswitch 75 is of the sudden break reversing type whose contact 84, which normally stays in each of the two end positions, is fixed to the end of bimetallic strip 76. The other end of this strip is fixed to the magnetic circuit 77 of the motor. Toothed rim 78 engages with pinion 79 which is an integral part of toothed wheel 80. The two toothed wheels 78 and 79 are helical toothing. The assembly 79-80 rotates about a shaft 81 and can be displaced longitudinally on this shaft. Other gear wheel trains (not shown) transmit movement from the motor through gears 79 and 80 to gear 78. A pushbutton 83 enables the mobile armature of the microswitch 75 to be pushed to its lower position.

Figure 2:
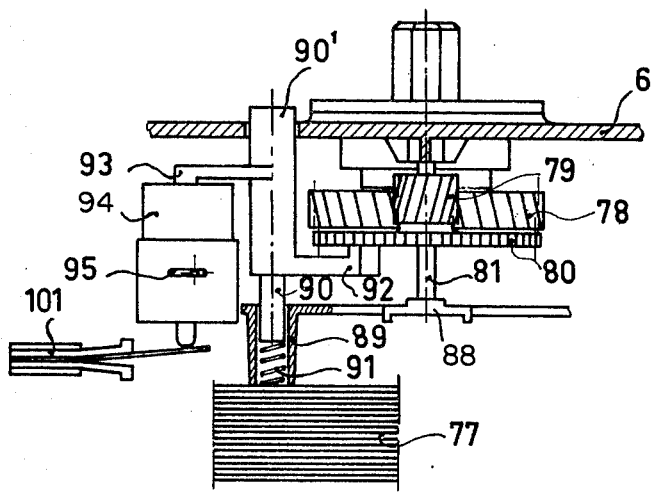
FIG. 2 is a partial view of a gear motor equipped with a stopping device having two limiting positions, which device can be manually reset by means of a push-button, the device being shown in its inoperative state.

FIG. 2 is an elevation of a gear motor equipped at the side with an automatic stopping device, the gear motor comprising the same principal elements as in U.S. patent application Ser. No. 429,820 filed Jan. 2nd, 1974, and shown in FIG. 6 namely: a helically toothed wheel 78 and a pinion 79 engaging with it; a toothed wheel 80, integral with the pinion 79, rotatable about a spindle 81 and freely displaceable axially thereon. The spindle 81 is mounted between a cover 6 of the motor housing and in a stirrup 88 of the drive motor, said motor stirrup being supported through feet 89 on plates 77.

In this embodiment, the automatic stopping device is formed as follows. One of the supporting feet 89 is formed with a bore in which a pushrod 90 is slidable. This pushrod 90, urged upwards by a spring 91, comprises a feeler 92 resting on the toothed wheel 80 and a finger 93. This finger 93 rests on a plate 94 slidable in a housing 95.

Figure 5:
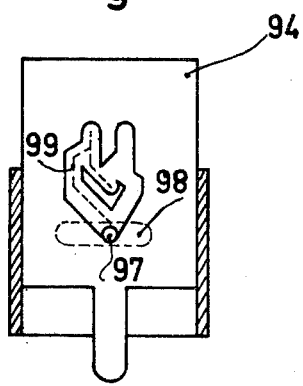
FIG. 5 is a longitudinal section through the device in its upper position corresponding to FIG. 2.
Figures 6, 7:
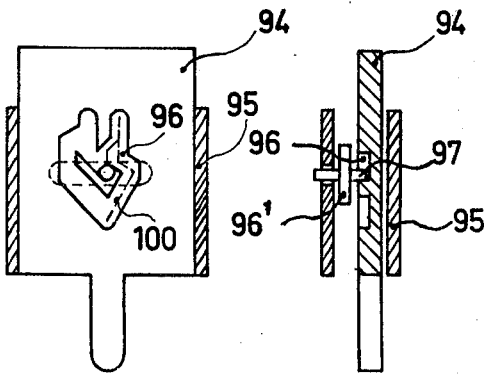
FIG. 6 is a longitudinal section through the same device in its lower position corresponding to FIG. 3.
FIG. 7 is a cross-section through the device in its lower position.

The device comprising the components 94 and 95 is a known reciprocating interrupter mechanism of the "pear" type. FIG. 5 shows it in detail. As shown in FIG. 7, the plate 94 is recessed to half its thickness at 96. A stud 97 is designed for transverse displacement in this recess, being guided by the slot 98 formed in the front face of the housing 95. This stud 96 is integral with a disc 96¹ so that it always remains perpendicular to the plate 94. The relative displacement of the stud 97 in the recess 96, when the element 94 is displaced axially along the line XY, is indicated by the arrow 99, for moving from the rest position shown in FIG. 29 to the rest position shown in FIG. 30, and by the arrow 100, for returning from the rest position shown in FIG. 30 to the rest position shown in FIG. 29.

The operation of an appliance for making sorbet equipped with the above-described device will be used in the manner described hereinafter.

Figure 3:
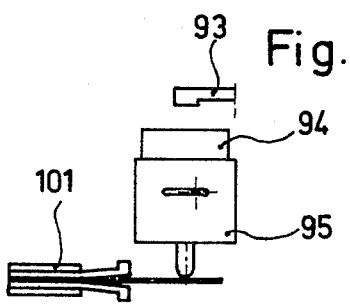
FIG. 3 is a view of the device after resetting.
Figure 4:
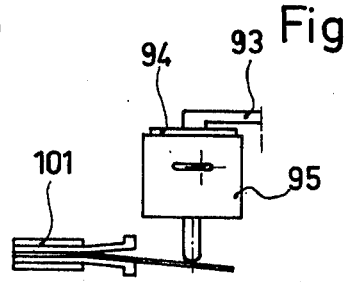
FIG. 4 is a view of the device when the blades are ready to be withdrawn.

To begin with, pressure is applied to the end 90¹ extending through the cover 6 of the gear motor housing. This depresses the plate 94 which remains in its lower rest position shown in FIG. 3, and keeps the miniature reversing switch 101 closed so that the gear motor does not receive current. After the sorbet-making appliance has been introduced into a refrigerator, the power cord is connected; the motor is thus started up. Since the mixing force is low, the pinion 80 remains in its upper position held by the action of the feeler 92 and the spring 91. As the mixing force increases, the wheel 80 descends, being subjected, as has already been seen, to the axial component of the torque between the parts 79-78. When the preparation to be iced is sufficiently hard, the wheel 80 is in its lowest position, keeping the assembly 92-90-93 and the plate 94 (FIG. 4) in their lower positions. When the blades withdraw, the engagement torque quickly disappears, the assembly 92-90-93 ascends under the action of the spring 91 and allows the plate 94 to ascend to the end position shown in FIG. 2. The movable armature of the microswitch follows this movement and breaks the motor feed circuit. If the second contact of the minature reversing switch is included in the feed circuit of a buzzer, the buzzer is activated to indicate that the blades of the appliance are in their withdrawn position.

Instead of using a push-button for resetting, it would be possible in principle to act manually upon the arm supporting the blades in a direction opposite to that in which it normally rotates. The resistance offered by the reduction gear establishes an engagement torque at the toothed wheels 78-79 identical with that obtained during mixing. This torque acts on the assembly 92-90-93 and on the mechanism 94-95. It is thus possible to close the motor feed circuit before it is brought into operation. However, the force required for this purpose is fairly high, and resetting is not obtained with each manual intervention.

A device without a push-button which is more reliable both in design and in use is described hereinafter with reference to FIGS. 8 to 13.

Figure 8:
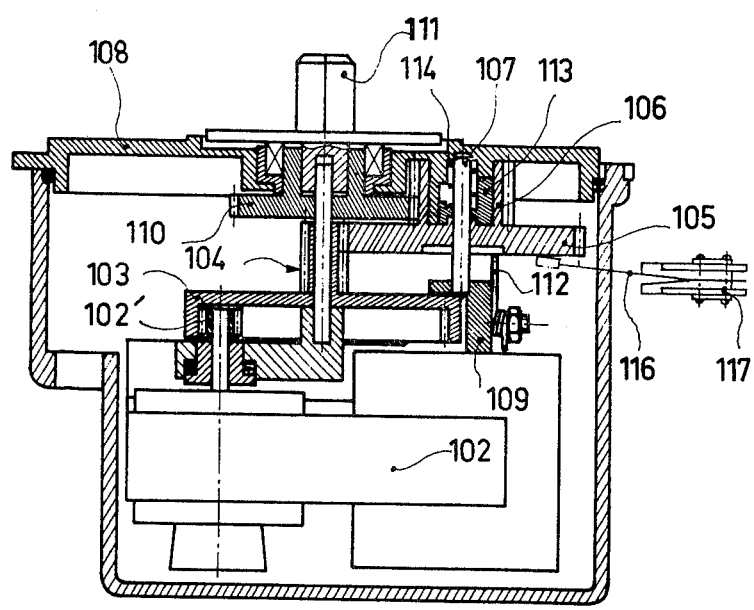
FIG. 8 is a section through a gear motor equipped with another embodiment of automatically reset stopping device, in its rest position.

FIG. 8 shows the gear motor in its upper position with the motor circuit open.

Figure 9:
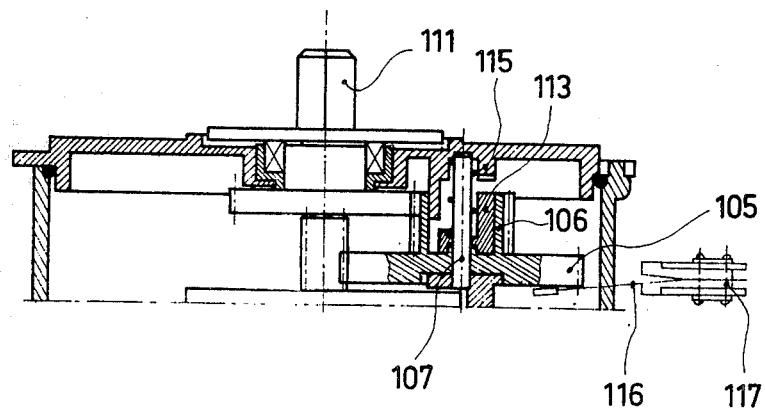
FIG. 9 is a view, partly in section, through this same embodiment, in its triggered position.

FIG. 9 shows the upper part of the gear motor in its lower position with the motor circuit closed.

The gear motor (FIGS. 8, 9 and 13) operates as follows. The output pinion 102' of the electrical motor 102 acts on an internally toothed ring 103 which comprises a stepped pinion 104 with rectangular teeth. A stepped toothed wheel, comprising rectangular teeth on its major diameter 105 and helical teeth 106 on its minor diameter, rotates about a spindle 107 sandwiched between the cover 108 and the stirrup 109 of the motor 102, the stirrup being specially constructed to accommodate the internally toothed ring 103. The stepped wheel 105-106 is adapted for axial displacement on the spindle 107. It meshes with a helically toothed wheel 110 fitted on to a drive hub 111. It is urged upwards by a spring pin 112 fixed to the stirrup 109.

The automatic stopping device is formed by a wheel 105-106 with a recess in which is accommodated a bell-shaped cam 113 adapted for radial and axial displacement on the spindle 107. This bell-shaped cam is acted on by spring 114 which applies it lightly against the base of the recess formed in the wheel 105-106. A countercam 115 forms an integral part of the cover 108.

It is already known that the stepped wheel 105-106 will be axially displaced according to the forces transmitted to the drive hub 111. In its displacement, this stepped wheel directly actuates the moving armature 116 of a miniature reversing switch 117. The reversing switch 117 is externally arranged in FIGS. 8 and 9 in order to simplify the drawing. In reality it is fixed to the stirrup 109 of the motor, as shown by the view from above in FIG. 13.

FIGS. 10, 11 and 12 are perspective views of the bell-shaped cam 113, the countercam 115, the spindle 107 and the spring 114. These Figures show the different positions which the displaceable bell-shaped cam 113 is able to assume relative to the fixed countercam 115 when the appliance is in use, as explained hereinafter.

When the appliance is stopped, the cam 113 is in its upper position (FIG. 10) and the two slopes 118 and 119 are in contact with one another. The miniature reversing switch 117 is in its open position in the motor circuit (FIG. 8).

In order to reset the device before it is used, the drive hub 111 is actuated by means of the blade-supporting arm in the direction opposite to the mixing direction. The result of this is to cause the stepped wheel 105-106 to descend whilst, at the same time, making it rotate in the direction indicated by the arrow 120. The friction-driven cam 113 moves into position, as shown in FIG. 11, wherein the tip 121 is engaged in the notch 122. When it descends, the wheel 105-106 actuates the movable armature 116 of the reversing switch 117, thus closing the motor supply circuit. This position of the reversing switch is unstable and is held by the stepped wheel 105-106 (FIG. 9).

The power cord of the appliance is connected and the motor started up.

As the preparation to be iced hardens, the stepped wheel 105-106 tends to descend, releasing the cam 113 until the moment when, the stepped wheel having descended to its lowest position, the cam 113 is subjected solely to the influence of the spring 114. Since rotation takes place in the direction indicated by the arrow 123, the tip 121 is released from the notch 122 and the cam, initially driven by friction, comes to rest in the position shown in FIG. 12. This rest position is determined by engagement of the surface 124 with the projection 125.

When the mixing force disappears through withdrawal of the blades, the stepped wheel 105-106 ascends under the effect of the spring pin 112 and pushes the cam into its rest position shown in FIG. 34. The moving armature 116 of the miniature reversing switch accompanies the wheel 105-106, breaks the motor supply circuit and if desired establishes contact with an alarm.

The automatic stopping device may be actuated in a more simple manner by the blades themselves on completion of their withdrawal movement. In this particular embodiment, one of the blades is provided with a projection which may break the motor supply circuit in either of two different ways.

Figure 14:
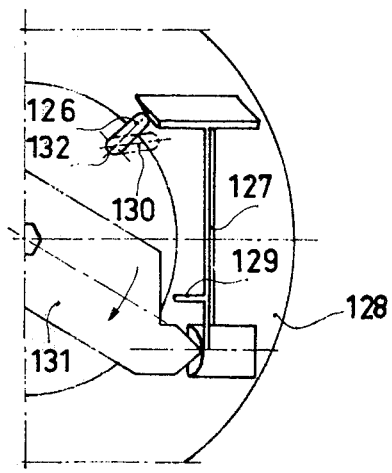
FIG. 14 is a view, partly from above, of an appliance for making sorbets equipped with an automatic stopping device triggered by one of the blades during the withdrawal thereof.

In a first embodiment (FIG. 14), a pivotable spindle 132 extends through the cover of the gear motor housing. At the end of the spindle inside the housing is mounted a cam whose function is to act on the movable armature of a microswitch or reversing switch (not shown in the Figure). That end of the spindle outside the casing is integral with a lever 126 actuated by a projection 129 on the blade 127, to break the motor supply circuit by entrainment of the cam.

In the rest position 126 of the lever shown in solid line, the electrical circuit of the motor is closed and the motor starts up as soon as the power cord of the appliance is connected. The blade 127 is lowered into the compartment 128 to freeze the preparation. When the blade is withdrawn under the increasing force generated by the freezing of the preparation, the projection 129 comes into contact with the lever 126 and causes it to pivot into the position 130 shown in broken line. This rotation results in breaking of the motor supply circuit and activation of the alarm, if any, under the action of the aforementioned cam.

When the appliance is used again, it is sufficient to grip the lever by hand to return it to its initial position 126.

In order to be certain that the two or more blades have been withdrawn when the motor is stopped, it is necessary for the other blade to be withdrawn before the blade equipped with the projection 129. To this end, the springs opposing the force attributable to mixing and accommodated in the hubs of the blades, as provided in application Ser. No. 292,121 of Sept. 25, 1972 are different. The spring accommodated in the blade which does not perform the function of stopping the motor is weaker than the blade by which the motor is stopped. In this way, it is possible to be certain that the two blades are withdrawn at the required moment.

However, this extremely simple system can satisfactorily be used only in appliance making sorbet with a single flavour. For appliances making sorbets with two flavours, comprising a circular partition according to application Ser. No. 292,121 filed Sept. 25, 1972 and having a blade in each of the compartments thus formed, some uncertainty exists in regard to the degree of withdrawal of the blades because the freezing times differ according to the flavours and to the nature of the preparation.

Figure 17:
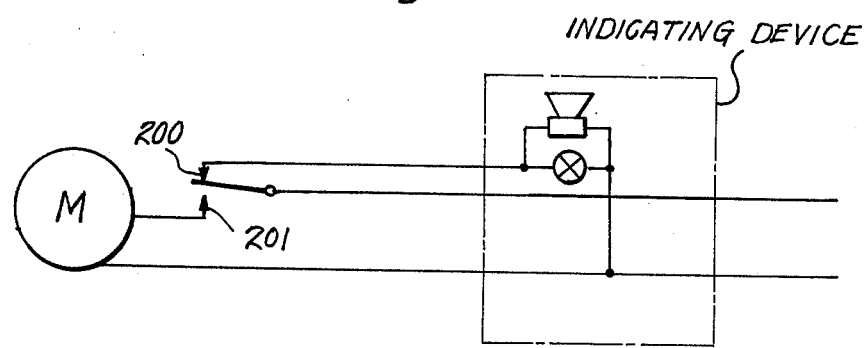
FIG. 17 is a circuit diagram representing the position of the switch in the motor supply lines.
Figure 16:
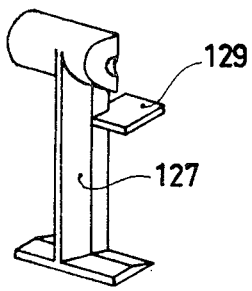
FIG. 16 is a perspective view of a blade adapted to stop a sorbet-making appliance.
Figure 15:
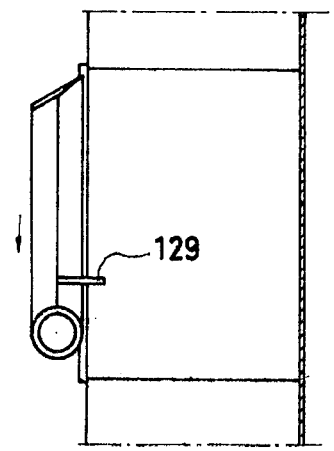
FIG. 15 is a side elevation of this stopping device.

FIG. 15 is a side view of the same device taken inside the compartment of the appliance, whilst FIG. 16 is a perspective view of the blade 127 provided with the projection 129. In a second embodiment (not shown), rotation of the arms 131 and blades 127 is blocked by means of a stop similar to the lever 126 but fixed to the gear motor housing. When the blade 127 is withdrawn, the projection 129 immobilises the arm by engagement with the above-mentioned stop. The motor, immobilised as a result, but still under voltage, heats up. A temperature limiter, included in the magnetic circuit of the motor and in series with the motor supply feed circuit, breaks the motor supply circuit. The stop is preferably mounted resiliently to prevent sudden stoppage. The motor may be started up again by resetting the temperature limiter by a suitable push-button device. FIG. 17 illustrates the use of a reversing type of switch in the motor supply circuit. When the switch is at 200, the circuit to the motor is cut off, and the indicating device is activated.

We claim:
1. In an appliance for making sorbet or ice cream and including means for preventing mixer blades from becoming locked in the ice by effecting a progressive withdrawal of the blades from a vertical orientation towards a horizontal orientation under the action of an opposing torque applied to the blades by the hardening of the ice during freezing, the improvement comprising an automatic stopping device including:
   a. a stepped pinion adapted for axial displacement in dependence upon the variation of said torque applied to the blades, and
   b. a switching means actuated by said stepped pinion to break a motor supply circuit when the blades reach their withdrawn position.

2. An appliance as defined in claim 1, wherein said switching means has a single stable position.

3. An appliance as claimed in claim 2, wherein the switching means is held in an unstable position in which it completes the motor supply circuit for as long as the torque is applied to the blades, and is released into said stable position in which it breaks the motor supply circuit when the withdrawal of the blades causes the torque to disappear, this withdrawal bringing the blades into a position in which they are situated outside the ice formed in the appliance.

4. An appliance as claimed in claim 3, further comprising an intermediate assembly comprising a plurality of arms, wherein the stepped pinion actuates a moving armature for interrupting the supply of motor current by means of a reciprocating circuit breaker categorized as being of the pear type, the axial displacement of the stepped pinion being transmitted thereto through arms forming part of an intermediate assembly acting against a spring.

5. An appliance as claimed in claim 4, wherein said intermediate assembly forms a push-button for resetting said automatic stopping device.

6. An appliance as defined in claim 3 further comprising a spring and wherein said switching means has a movable circuit-breaking armature, wherein said stepped pinion has a recess therein and is urged upwardly by said spring and acts directly on said movable circuit-breaking armature of said switching means, the pinion's action on said armature being controlled by a profiled cam and a countercam having two notches therein, said countercam being mounted coaxially with said stepped pinion and incorporated in said recess formed therein, the cam being pressed against a wall of the recess by a spring, whilst the countercam is held fixed so that the cam is radially displaceable between the two notches provided in the countercam.

7. An appliance as claimed in claim 3, further comprising a supporting arm means for supporting the blades, wherein:
   a. said arm and blades rotate in a first direction in mixing said sorbet, and
   b. said automatic stopping device is resettable by acting manually on said supporting arm means to apply a force thereto in a direction opposite to said first direction.

8. An appliance as recited in claim 3 further comprising an indicating means activated by said switching means when the blades reach their withdrawn position.

* * * * *